March 27, 1934.  R. W. LYTLE  1,952,811
METHOD OF MANUFACTURING SILENT GEARS
Original Filed Oct. 1, 1931
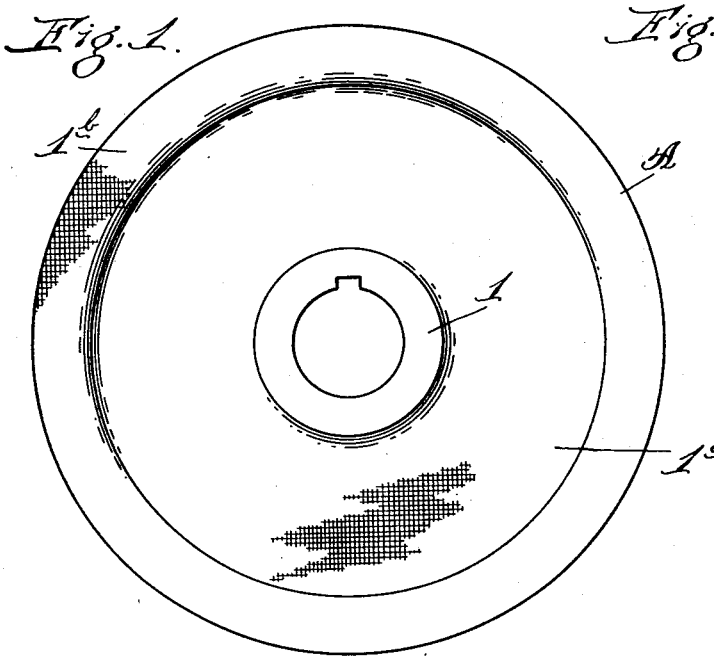
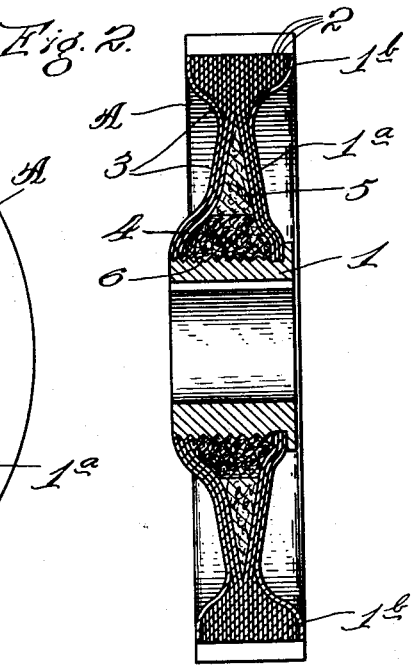
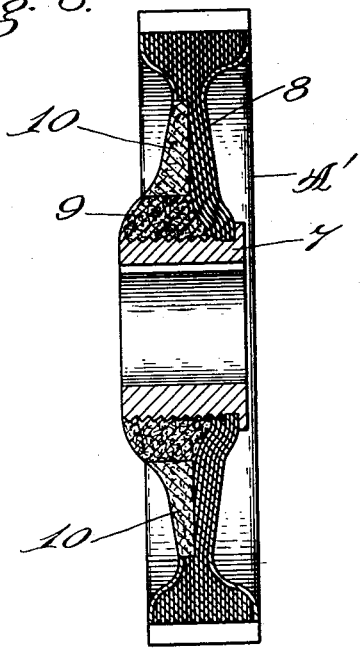
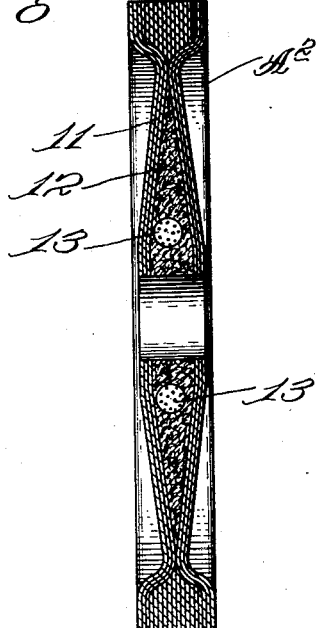
Inventor:
Robert W. Lytle.
By Dyrenforth, Lee, Chritton & Wiles
Attys.

Patented Mar. 27, 1934

1,952,811

UNITED STATES PATENT OFFICE 1,952,811

METHOD OF MANUFACTURING SILENT GEARS

Robert W. Lytle, Cincinnati, Ohio, assignor to The Formica Insulation Company, Cincinnati, Ohio, a corporation of Ohio Original application October 1, 1931, Serial No. 566,352. Divided and this application June 11, 1932, Serial No. 616,698

3 Claims. (Cl. 154—2)

This invention relates particularly to an improved method of manufacturing gear wheels of the silent gear type. Such gears are commonly made from a laminated product composed of cloth impregnated with a varnish such as bakelite, the mass being compacted and hardened under heat and pressure.

Molded gear-blanks have heretofore been produced. The present invention pertains particularly to the manufacture of a molded gear-blank.

The primary object of the present invention is to provide an improved silent gear. One purpose is to provide a gear of suitable strength which can be produced cheaply. Another purpose is to provide a gear of this character having means for obviating or lessening the hum which is liable to occur in ordinary gears of this general type, when operated at high speed.

In accordance with the present invention, a body of unimpregnated fibrous material is incorporated in the gear blank, which has the effect of varying, or changing, vibration frequencies, thus reducing the hum of the gear. The cost of the gear may be lessened in this manner, also.

In gears of this general type, as ordinarily manufactured, a uniform type of material has commonly been employed, resulting in uniform vibration frequencies, which produce a high pitch or low pitch tone, depending upon the mass and shape of the section. In the preferred practice of the present invention, a relatively cheaper, unimpregnated fibrous material is incorporated as a portion of the web of the wheel, having the effect of changing the length of tone waves and frequencies of vibration, so as to produce a marked reduction in noise of operation.

Preferably, a quantity of mineral fiber, such as asbestos, in unimpregnated condition, is incorporated as a part of the web of the gear. Vegetable fiber, woven cotton, wool fiber, or felted wool, for example, may be used, provided the hardening of the gear blank is effected at a low enough temperature to prevent serious injury thereto. However, the use of mineral fiber is preferred.

The invention is illustrated in a preferred embodiment in the accompanying drawing, in which—

Fig. 1 is an elevational view of a gear blank made in accordance with the invention; Fig. 2, a sectional view of the form shown in Fig. 1, after the gear-teeth have been cut; Fig. 3, a sectional view of a modified form of the gear; and Fig. 4, a sectional view of a gear blank, forming another modification of the invention.

In the construction illustrated in Figs. 1 and 2 the wheel, designated A, is shown as comprising a metallic sleeve or hub 1; a web 1$^a$ and a rim 1$^b$.

The rim-portion may consist chiefly of rings 2 of impregnated fabric and disks 3 of impregnated fabric, which form portions of the rim and of the web including the enlargement of the hub at the hub-portion.

The enlargement at the hub-portion of the web may be effected by introducing between the layers of fabric a suitable molding compound, such as a molding powder consisting of macerated fabric impregnated with bakelite. This material is designated 4.

A ring of unimpregnated loose fibrous material 5 is introduced between the annulus 4 and the rim-portion of the wheel.

Any suitable artificial resin adapted to harden under heat and pressure may be employed to impregnate the fabric and the macerated material forming the body 4.

A phenolic condensation product ordinarily is employed for the purpose, but other artificial resins, such as urea-formaldehyde condensation products, a suitable furfural resin, or the like, may be employed.

The structure is assembled in any suitable manner. It is then introduced into a die and molded under heat and pressure in a manner now understood in the art. A suitable temperature is shown about 150° C. to 175° C.; and a suitable pressure is about 1500 pounds per square inch, or considerably more, if desired. During the molding operation the dies may be relieved one or more times to permit escape of gases. In the die-pressing operation the product is consolidated and hardened and the potentially reactive resin employed is converted to a hard and substantially insoluble condition. If desired, the wheel, after removal from the dies, may be heat treated in an oil bath, first at about 60° C., and then at about 90° C., or higher, for a period of 30–60 hours. Such treatment has the effect of rendering the product still more resistant and shrinking the non-metallic portion of the wheel upon the metallic center.

The ring 5 may be built up of asbestos wool, or other relatively soft fibrous material. Owing to the fact that this material is not impregnated with a solution of bakelite, it will remain relatively soft. Some of the binder in the adjacent impregnated stock may enter the surface portions of the body 5, but without defeating the purpose of the use of this element.

The metallic sleeve 1 preferably is provided with projections adapted to prevent either lateral or torsional movement, as indicated at 6. Such projections may be formed, if desired, of diagonal cross cuts in the outer surface of the ring 1.

In the modification shown in Fig. 3, the wheel, designated A', is shown as comprising a metal center 7, laminations 8; impregnated macerated material 9; and unimpregnated fibrous material 10, which is compacted in the molding operation, but not hardened in the same degree as the remaining portions of the non-metallic parts of the wheel, one surface of the body, or ring 10, is shown exposed, it being understood that the exposed surface is suitably hardened or compacted and the ring itself is bound to the adjacent laminated stock and the material 9 by the binder employed in the laminated stock and in the macerated stock 9. If desired, a sheet of fabric may cover the ring 10.

In the modification shown in Fig. 4, the wheel, designated A², is shown as comprising impregnated laminated stock 11; impregnated macerated fibrous stock 12; and a ring of unimpregnated stock 13, which may be composed of asbestos yarns suitably twisted together to form a ring. The assembly is molded and hardened under heat and pressure. The stock 13 remains relatively soft, although surface portions thereof become impregnated and bonded to the adjacent impregnated stock. In the modification in Fig. 4, the metallic center is omitted. Obviously, it may be employed, however, if desired.

In each of the modifications shown an annular body of unimpregnated fibrous stock is incorporated between the center and the rim of the gear, and is adapted to change vibration frequencies and reduce the hum of the gear in operation.

It is practicable to employ the unimpregnated stock in sufficient quantity to reduce the cost of the gear, while still maintaining necessary strength.

While it is preferred to employ unimpregnated fibrous stock as a material of different density and other physical characteristics from that of the laminated stock employed, it is not desired to unnecessarily limit the invention. A relatively soft metal, such as lead, has a different density and a different vibration frequency and may serve the purpose satisfactorily for certain uses.

The present application constitutes a division of my application Ser. No. 566,352, filed October 1st, 1931.

The foregoing detailed description has been given for clearness of understanding only, and no unnecessary limitations should be understood therefrom, but the appended claims should be construed as broadly as permissible in view of the prior art.

What I regard as new, and desire to secure by Letters Patent, is:

1. The process of producing a wheel having a rim and web formed integrally with each other, which process comprises forming a wheel structure including a rim portion consisting wholly of fibrous material impregnated with a binder which hardens under heat and pressure, a web portion consisting partly of fibrous material impregnated with a binder which hardens under heat and pressure and the remainder of substantially unimpregnated fibrous compressible material within the web-portion and wholly within a circle corresponding with the inner circumference of the rim; introducing the structure into a mold; and consolidating the structure under heat and pressure.

2. The process stated in claim 1, as practiced by employing in the web-portion impregnated layers of a fabric separated by a central space and introducing the unimpregnated fibrous material between said impregnated layers of fabric.

3. A process as stated in claim 1, in which impregnated plies of fabric are employed to form spaced walls at the web portion of the wheel, a body of impregnated fibrous material comprising a molding compound is introduced between the planes of said plies, and a body of unimpregnated fibrous material is imbedded within said body of molding compound.

ROBERT W. LYTLE.